United States Patent [19]

Van Baar et al.

[11] Patent Number: 4,959,086
[45] Date of Patent: Sep. 25, 1990

[54] REMOVING HYDROGEN SULPHIDE FROM A GAS MIXTURE

[75] Inventors: Johannes F. Van Baar; Walterus J. Van Lith, both of Amsterdam, Netherlands

[73] Assignee: Shell Oil Company, Houston, Tex.

[21] Appl. No.: 424,649

[22] Filed: Oct. 20, 1989

[30] Foreign Application Priority Data

Oct. 25, 1988 [GB] United Kingdom ............... 8824943

[51] Int. Cl.$^5$ .............................................. B01D 53/14
[52] U.S. Cl. ........................................ 55/73; 423/228
[58] Field of Search ...................... 55/73, 68; 423/220, 423/226, 228

[56] References Cited

U.S. PATENT DOCUMENTS 4,360,363 11/1982 Devlin et al. ........................ 55/73
4,748,011 5/1988 Baize ................................. 423/228

*Primary Examiner*—Charles Hart

[57] ABSTRACT

A process for removing hydrogen sulphide from a gas mixture including hydrogen sulphide comprising contacting the gas mixture with a liquid absorbent composition including an aminopyridine, such as 4-dimethylaminopyridine.

11 Claims, No Drawings

REMOVING HYDROGEN SULPHIDE FROM A GAS MIXTURE

FIELD OF THE INVENTION

The present invention relates to a process for removing hydrogen sulphide from a gas mixture containing hydrogen sulphide and carbon dioxide, wherein the gas mixture is contacted in a gas/liquid contacting column with a liquid absorbent composition comprising a base in the form of an amine. In the absorbent composition the base reacts with hydrogen sulphide and carbon dioxide to form soluble compounds. From the gas/liquid contacting column are removed a purified gas substantially free from hydrogen sulphide and rich absorbent composition loaded with the hydrogen sulphide and carbon dioxide removed from the gas mixture. The rich absorbent composition is regenerated by applying heat and/or stripping with an inert gas, such as steam, to produce a gas rich in hydrogen sulphide and lean absorbent composition which is reused.

The invention relates more particularly to a process for removing selectively hydrogen sulphide from the gas mixture by using a selective absorbent composition. In the specification the expression "selective absorbent composition" is used to refer to an absorbent composition containing a base which has a large $H_2S$-loading capacity (mol $H_2S$/mol base) and which has a small carbon dioxide absorption rate ($J_0$).

BACKGROUND OF THE INVENTION

A known absorbent composition for such a selective removal process is an absorbent composition including a tertiary amine, such as methyldiethanolamine (MDEA).

It is an object of the present invention to provide a more selective process for removing hydrogen sulphide from a gas mixture.

SUMMARY OF THE INVENTION

To this end the process for removing hydrogen sulphide from a gas mixture including hydrogen sulphide according to the present invention comprises contacting the gas mixture with a liquid absorbent composition including an aminopyridine.

In the specification and in the claims the term "aminopyridine" is used to refer to a pyridine compound having an amino group which is directly attached to the pyridine ring. For example, suitable aminopyridines include those compounds in which the amino group is attached to the pyridine ring in the para position, and so the aminopyridine has the structure as shown below.

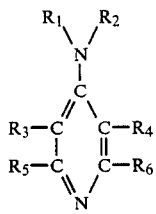

In the above shown structure, $R_1$ and $R_2$ can be hydrogen, an alkyl group. If $R_1$ and $R_2$ are hydrogen then suitably $R_3$, $R_4$, $R_5$, and $R_6$ are independently selected from the group containing hydrogen, an alkyl group and an alkoxy group. If on the other hand $R_1$ and $R_2$ are an alkyl group, then $R_3$ and $R_4$ are hydrogen, and $R_5$ and $R_6$ are independently selected from the group containing hydrogen, an alkyl group and an alkoxy group.

In a further suitable embodiment $R_1$ and $R_2$ form an alkylene group containing 4–5 carbon atoms, $R_3$ and $R_4$ are hydrogen, and $R_5$ and $R_6$ are independently selected from the group containing hydrogen, an alkyl group and an alkoxy group.

In the aminopyridine compounds of the invention, the alkyl and alkoxy groups can contain from 1 to about 10 carbon atoms, preferably from 1 to about 4 carbon atoms. Examples of the latter compounds are 4-dimethylaminopyridine (to be referred to as DMAP), 2-methyl-4-(dimethylamino)pyridine (to be referred to as DMAPP) and 2,6-dimethyl-4-(dimethylamino)pyridine (to be referred to as DMAPL).

A suitable aminopyridine is DMAP. A preferred aminopyridine is DMAPP and especially DMAPL.

The absorbent composition can also include water and a physical solvent. Examples of such physical solvents include lower alkane diols (glycols) and polyols, or lower alkyl ethers thereof, esters, sulfolanes, and the like.

Suitably the absorbent composition is an aqueous solution comprising between 0.3 to 2 mol/l physical solvent, such as sulfolane, and between 1 and 4 mol/l aminopyridine, and more suitably between 1 and 2 mol/l aminopyridine. The physical solvent is added to prevent phase separation of the absorbent composition.

Examples of gas mixtures which contain hydrogen sulphide and carbon dioxide and from which hydrogen sulphide has to be selectively removed with the process according to the present invention include natural gas or reduced Claus off-gas.

In the process according to the invention contacting is usually carried out at a temperature between 20° and 80° C. and at a pressure which is about atmospheric pressure. If required contacting can well be carried out at an elevated pressure.

Usually the gas mixture is counter-currently contacted in a gas/liquid contacting column, such as a tray column, with the absorbent composition. Contacting can as well take place in a gas/liquid contacting column provided with swirl tubes, with random packing or with structured packing.

Rich absorbent composition laden with hydrogen sulphide is regenerated by heating the solution and/or stripping the composition with an inert gas such as steam. Regeneration is suitably carried out at or close to atmospheric pressure. If contacting is carried out at an elevated pressure, regeneration can be preceded by one or more flash stage(s) in which the absorbent composition is flashed to a lower pressure to separate absorbed gas such as natural gas or carbon dioxide from the composition.

The invention is illustrated by the following examples, which should not be regarded as limiting it in any way.

EXAMPLE 1

To determine the carbon dioxide absorption rate of an absorbent composition containing MDEA, DMAP, DMAPP or DMAPL, four experiments were carried out. In each of the experiments 95 ml of an aqueous solution of the base was contacted in a vessel at a temperature of 30° C. with carbon dioxide at a constant partial pressure of 1 bar. During contacting the absorbent composition was slowly stirred to ensure a well defined gas-liquid interfacial area. At regular intervals the amount of carbon dioxide absorbed in the absorbent composition was determined until equilibrium was reached. From these data the initial carbon dioxide absorption rate was estimated which was divided by the area of the gas/liquid interfacial surface to obtain $J_0$. $J_0$ turned out to be independent of the stirring rate so that its magnitude is a good measure for the $CO_2$ reaction kinetics.

The results included in the following table show that although an absorbent composition containing DMAP, DMAPP or DMAPL contains a stronger base than MDEA such a composition has a $J_0$ which is similar to the $J_0$ of MDEA.

| Base | Concentration (mol/l) | pKA (at 20° C.) | JO (mol/m2/s) (at 30° C.) |
|---|---|---|---|
| MDEA | 1.54 | 8.6 | $2.4*10^{-3}$ |
| DMAP | 1.5 | 9.7 | $2.3*10^{-3}$ |
| DMAPP | 1.2 | 10.1 | $2.5*10^{-3}$ |
| DMAPL | 1.47 | 10.5 | $2.5*10^{-3}$ |

The pKa of the MDEA and DMAP can be found in *Dissociation Constants of Organic Bases in Aqueous Solutions* by D. D. Perrin, London, 1965. The pKa of DMAPP and DMAPL was determined separately.

EXAMPLE 2

Experimentally the $H_2S$-loading capacity at equilibrium (x) of a DMAP-containing absorption composition and that of an MDEA-containing absorption composition were determined as a function of the partial pressure of hydrogen sulphide (p$H_2S$).

The aqueous DMAP-containing absorption composition contained 1.65 mol DMAP/l and 0.33 mol sulfolane/l; and the aqueous MDEA-containing absorption composition contained 1.71 mol MDEA/l. The experiments were carried out at 30° C.

The results are shown in the following table.

| Aqueous DMAP | | Aqueous DMAPL | | Aqueous MDEA | |
|---|---|---|---|---|---|
| p$H_2S$ (bar) | x* | p$H_2S$ (bar) | x** | P$H_2S$ · (bar) | x*** |
| 0.007 | 0.219 | 0.007 | 0.474 | 0.007 | 0.139 |
| 0.035 | 0.502 | 0.035 | 0.729 | 0.035 | 0.334 |
| 0.103 | 0.711 | 0.103 | 0.880 | 0.103 | 0.543 |
| 0.632 | 0.945 | 0.632 | 1.006 | 0.632 | 0.892 |
| 1.821 | 1.072 | 1.820 | 1.079 | 1.820 | 1.053 |
| 3.893 | 1.221 | 4.000 | 1.240 | 3.950 | 1.212 |
| 7.933 | 1.530 | 7.950 | 1.500 | 7.950 | 1.468 |
| 13.290 | 1.900 | 13.300 | 1.810 | 13.300 | 1.797 |

*Mol $H_2S$/mol DMAP
**Mol $H_2S$/mol DMAPL
***Mol $H_2S$/mol MDEA

From the above table it can be concluded that, in particular at low partial pressures, the $H_2S$-loading capacity of aqueous DMAP is greater than that of aqueous MDEA and that the $H_2S$-loading capacity of aqueous DMAPL is greater than the $H_2S$-loading capacity of aqueous DMAP.

What is claimed is:

1. A process for removing hydrogen sulphide from a gas mixture including hydrogen sulphide comprising contacting the gas mixture with a liquid absorbent composition comprising an aminopyridine.

2. A process as claimed in claim 1, wherein the aminopyridine has the formula

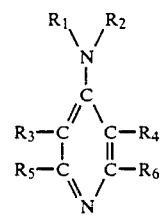

wherein $R_1$ and $R_2$ are hydrogen, or an alkyl group, when $R_1$ and $R_2$ are hydrogen then $R_3$, $R_4$, $R_5$ and $R_6$ are independently hydrogen, an alkyl group or an alkoxy group, or when $R_1$ and $R_2$ are an alkyl group, then $R_3$ and $R_4$ are hydrogen, and $R_5$ and $R_6$ are independently hydrogen, an alkyl group and an alkoxy group, or $R_1$ and $R_2$ from an alkylene group containing 4–5 carbon atoms, $R_3$ and $R_4$ are hydrogen and $R_5$ and $R_6$ are independently hydrogen, an alkyl group or an alkoxy group.

3. A process as claimed in claim 2, wherein $R_1$ and $R_2$ are hydrogen, and wherein $R_3$, $R_4$, $R_5$, and $R_6$ are independently hydrogen, an alkyl group and an alkoxy group.

4. A process as claimed in claim 2, wherein $R_1$ and $R_2$ are an alkyl group, wherein $R_3$ and $R_4$ are hydrogen, and $R_5$ and $R_6$ are independently hydrogen, an alkyl group and an alkoxy group.

5. A process as claimed in claim 2, wherein $R_1$ and $R_2$ form an alkylene group containing 4–5 carbon atoms, wherein $R_3$ and $R_4$ are hydrogen, and $R_5$ and $R_6$ are independently hydrogen, an alkyl group and an alkoxy group.

6. A process as claimed in claim 1, wherein the aminopyridine is 4-dimethylaminopyridine.

7. A process according to claim 1 wherein the aminopyridine is 2-methyl-4-(dimethylamino)pyridine.

8. A process as claimed in any one of the claims 1–7, wherein the absorbent composition is an aqueous solution comprising between 0.3 to 2 mol/l physical solvent and between 1 and 4 mol/l aminopyridine.

9. A process as claimed in claim 8, wherein the absorbent composition an comprises between 1 and 2 mol/l aminopyridine.

10. A process as claimed in any one of claims 1–7, wherein the gas mixture further comprises carbon dioxide.

11. A process according to claim 8 wherein the physical solvent is sulfolane.

* * * * *